(12) United States Patent
Morakéas

(10) Patent No.: US 11,429,562 B1
(45) Date of Patent: *Aug. 30, 2022

(54) INTERACTIVE CONTACT ORGANIZATIONAL INFORMATION RETRIEVAL AND ARCHIVE TRANSPORT SYSTEM WITH NOTIFICATIONS AND CONTACT-CENTRIC ARCHIVE FOR OBJECTS

(71) Applicant: Gregōríos Anastasios Morakéas, Nashville, TN (US)

(72) Inventor: Gregōríos Anastasios Morakéas, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,091

(22) Filed: Mar. 8, 2021

Related U.S. Application Data

(63) Continuation of application No. 16/722,570, filed on Dec. 20, 2019, now Pat. No. 10,942,896.

(60) Provisional application No. 62/782,493, filed on Dec. 20, 2018.

(51) Int. Cl.
| | | |
|---|---|---|
| *G06F 16/16* | (2019.01) | |
| *G06F 16/11* | (2019.01) | |
| *G06F 9/54* | (2006.01) | |
| *G06F 3/0488* | (2022.01) | |
| *G06F 3/0482* | (2013.01) | |
| *H04L 51/08* | (2022.01) | |

(52) U.S. Cl.
CPC .......... *G06F 16/168* (2019.01); *G06F 3/0482* (2013.01); *G06F 3/0488* (2013.01); *G06F 9/542* (2013.01); *G06F 16/113* (2019.01); *H04L 51/08* (2013.01)

(58) Field of Classification Search
CPC ...................................................... G06F 16/168
See application file for complete search history.

(56) References Cited

U.S. PATENT DOCUMENTS

2018/0097757 A1 * 4/2018 Nguyen ................ G06F 16/182

FOREIGN PATENT DOCUMENTS

WO    WO-2018148926 A1 *  8/2018 ............. H04L 51/36

* cited by examiner

*Primary Examiner* — Roland J Casillas
(74) *Attorney, Agent, or Firm* — Rimon Law, P.C.

(57) ABSTRACT

An interactive contact organizational information retrieval and archive transport system with notifications and contact-centric archive for objects is presented, offering touch screen interface interaction, indication receipt and storage. Users create repositories of objects assigned to specific contact profiles. Any communication with contact triggers notification of the object that is waiting in active repository. User swipes open active repository offering options, including open, send, keep active, archive, etc. Activated by contacts, the application aggregates an object or string of objects associated with a communication linked to the contact profile, making accessible those objects across all user devices, creating folders and subfolders in the profile. After communication, the application offers options to archive or keep object active. Scheduling and desired features reside in Global and local settings. Reminders, notes, links, photos, documents, text, voice notes, quotes etc. are addable. The application mirrors stored information on the device's home screen.

13 Claims, 11 Drawing Sheets

Active Repository / Active Screen #1

Active Screen / Active Repository — Active Screen & Active Repository — Any Screen

INTERACTIVE CONTACT ORGANIZATIONAL INFORMATION RETRIEVAL AND ARCHIVE TRANSPORT SYSTEM WITH NOTIFICATIONS AND CONTACT-CENTRIC ARCHIVE FOR OBJECTS

CROSS-REFERENCE TO RELATED APPLICATIONS

This application is a Continuation of U.S. patent application Ser. No. 16/722,570 filed Dec. 20, 2019, (now U.S. Pat. No. 10,942,896), which in turn claims the benefit of U.S. provisional patent application No. 62/782,493 filed on Dec. 20, 2018. All of the above patent applications are incorporated herein by reference.

SUMMARY

The present invention relates to a contact-centric interactive eco-system that organizes, and aggregates a string of objects under a contacts profile, prompting the user to immediately access related objects upon any form of communicative interaction, optioning the archival of any object/s immediately or when a communication is completed. The user can maintain the object/s active to re-engage through the application for another conversation. Object/s is/are immediately accessible during a calendar scheduled event or during another communication with the contact from any user communication screen.

DETAILED DESCRIPTION OF THE INVENTION

Flow
X Proximity
Objects—Information/Objects are attached to contact/s and bunched or aggregated based on conversations and interactions. Including: a. Category, Contact name, Title, Time, and Date stamp.

System Flow
An Object, which could be; a document, text, link, screen shot, any attachable item etc., is added in the contacts profile to the active repository. (See 2a in FIG. 1D and see also FIG. 1E).

A single object, or multiple objects, can be assigned as active to a single user, multiple users, groups etc. with assignable priority levels. (See FIGS. 1G and 1H). User can further designate object/s to folders and subfolders.

By default, the objects remain in a contacts active repository for a period of time, where their actionable objects are stored.

The active repository is immediately triggered by any contact related communication, including text or any text related program, mobile call, e-mail, etc. this interaction creates a notification event.

A Contact may be an individual, multiple individuals, group, company, subject, or as designated by the user.

A Notification takes place when a Contact interacts with the user, the system identifies a tagged object in the active repository which triggers the notification.

Figure 1A:
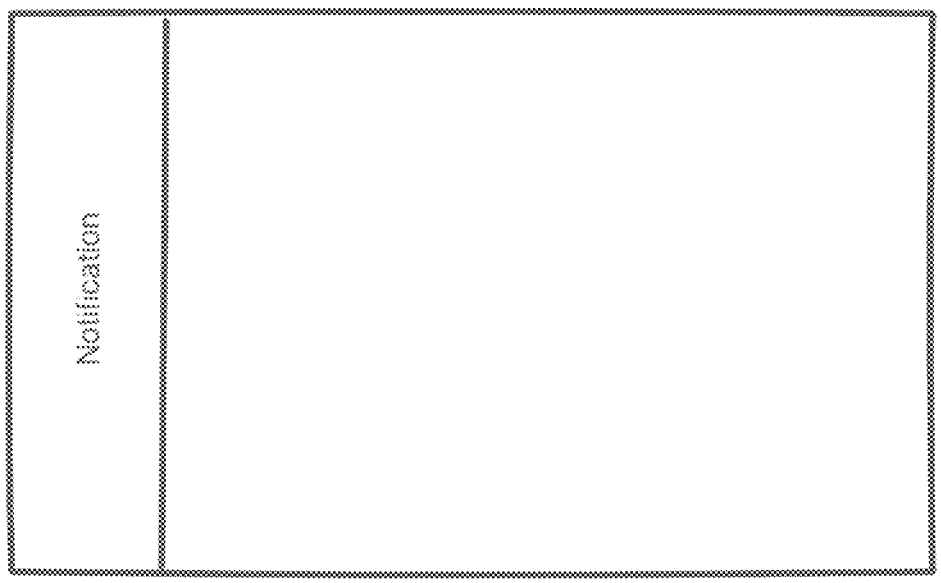
FIG. 1A Notifications.

Notification type includes but is not limited to; a notification window, vibration, sound or sound file, relevant appearing image or animated graphic, light effects, strobe, etc. (See FIG. 1A).

Figure 1B:
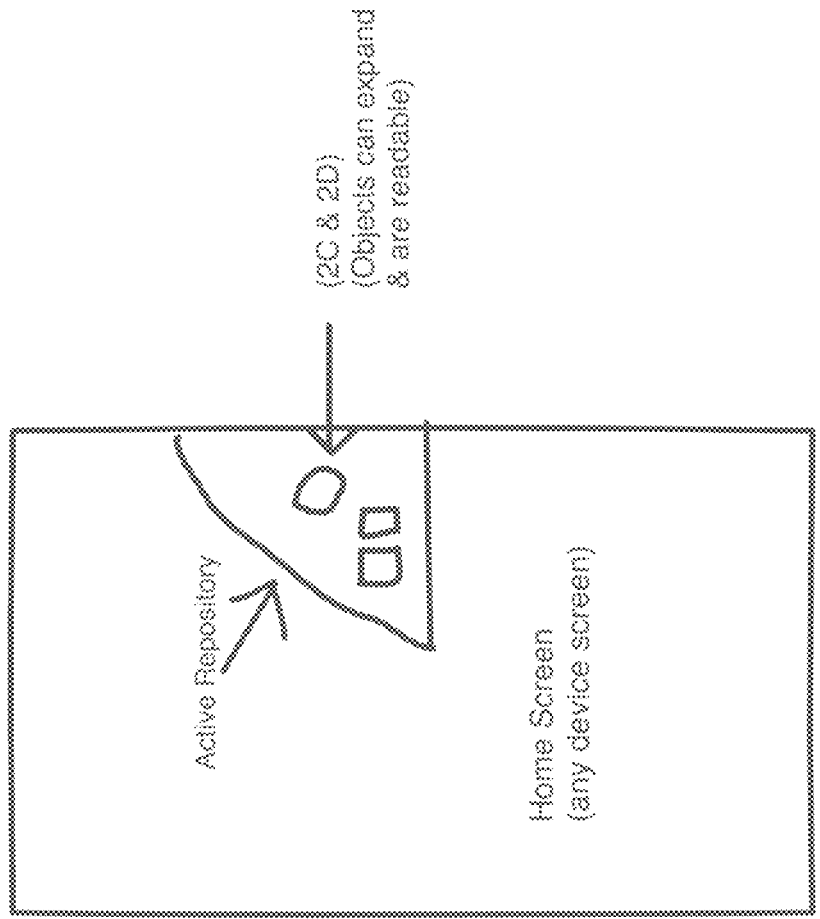
FIG. 1B Active Repository—with active Objects for active conversation.
Figure 1B:
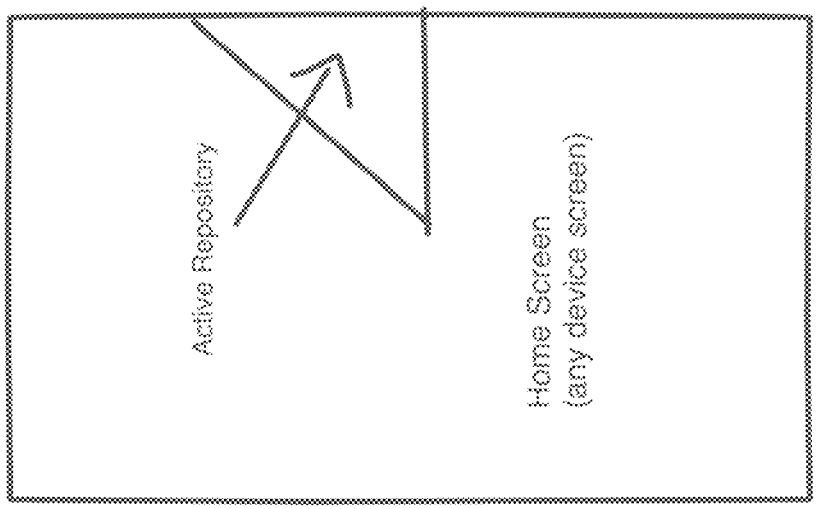
Figure 1C:
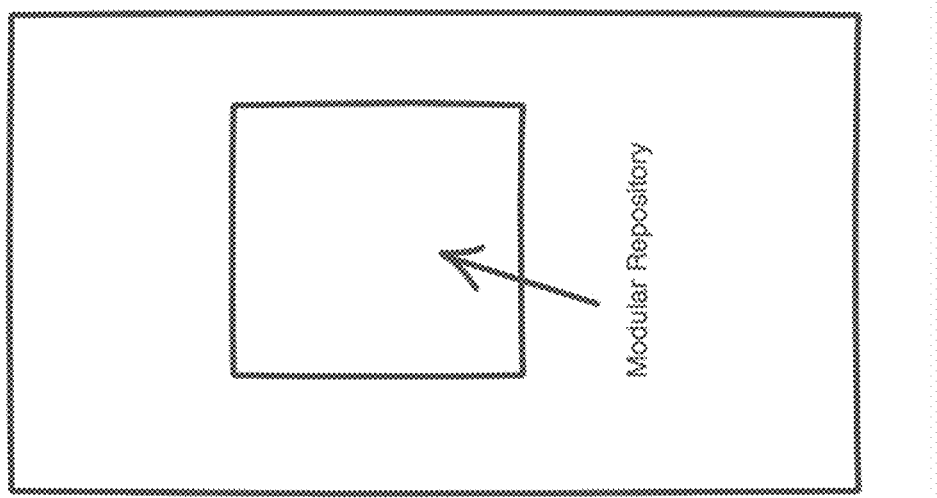
FIG. 1C Active Repository is modular and can be moved.

After the notification prompt, the user has the option to open the *Modular repository by touching the screen in a swiping motion, (See FIG. 1C). (See note on *Modular)

The user has access to their active object or multiple active objects. (See 2c and 2d in FIG. 1B).

In the opened active screen, the user immediately sees the tagged object/s. User also has the choice to navigate through folders and sub folders to access other objects. (See FIG. 1B).

During communications, Text, Email, Phone call, Video call, etc., the user is presented with various options, but not limited to, carrying out the following by tapping on the object from the home screen: Open and read/access the content of the object. Archived objects can also be accessed. Send the object/s to contact/s. Share and collaborate in real time with an individual or group. Keep the object active. Schedule a triggering or retriggering calendar event. Archive the re-accessible object. Delete the object.

When the communication is completed, the application applies a date and time stamp to the interaction and offers the user various options including, archive, keep active, add new contact create profile, duplicate and add object/s to another profile, delete.

Home Screen
From the home screen, or from the application or device through which the communication is being conducted, the user uses a swiping motion or taps on the screen to open the 90-degree angled window or window, that is specifically related to the communication which has been prompted. The screen or home screen, where the communication takes place, allows access to the stored object/s. (See FIG. 1B).

The 90-degree angle opens with a view of the items stored in the repository. The object/s stored, are located in a repository of the user's contact/s profile/s. The application creates an access point on the user's home screen or on the device on which the communication is taking place. The repository access to objects, is the same in the home screen and the communication application screen, as they are both in the contact/s profile.

Contacts Overview
An indigenous program that interfaces between the Application repository and the contacts on the user's device.

User imports contacts into the application. User can then access their contact list to associate with the applications functionality. When an event is triggered what is in the users contact profile appears on the home screen display of that communication in the active repository (See FIG. 1E). (Communications can be, but not limited to; phone call, text, geo-fencing, calendar dated meeting, etc., set in global settings, applicable to any (or select) communications). The Active Repository in the contact's profile is mirrored on the home screen and immediately accessible from the home screen.

The user's objects are organized under the contact profile, date and time stamped, aggregated, bunched, grouped, or organized in chunks, according to a communication or event. From the home screen or screen the communication is taking place, the application notifies the user of objects associated with a contact, group, or project folder. A notification takes place based on a communication query.

Figure 1D:
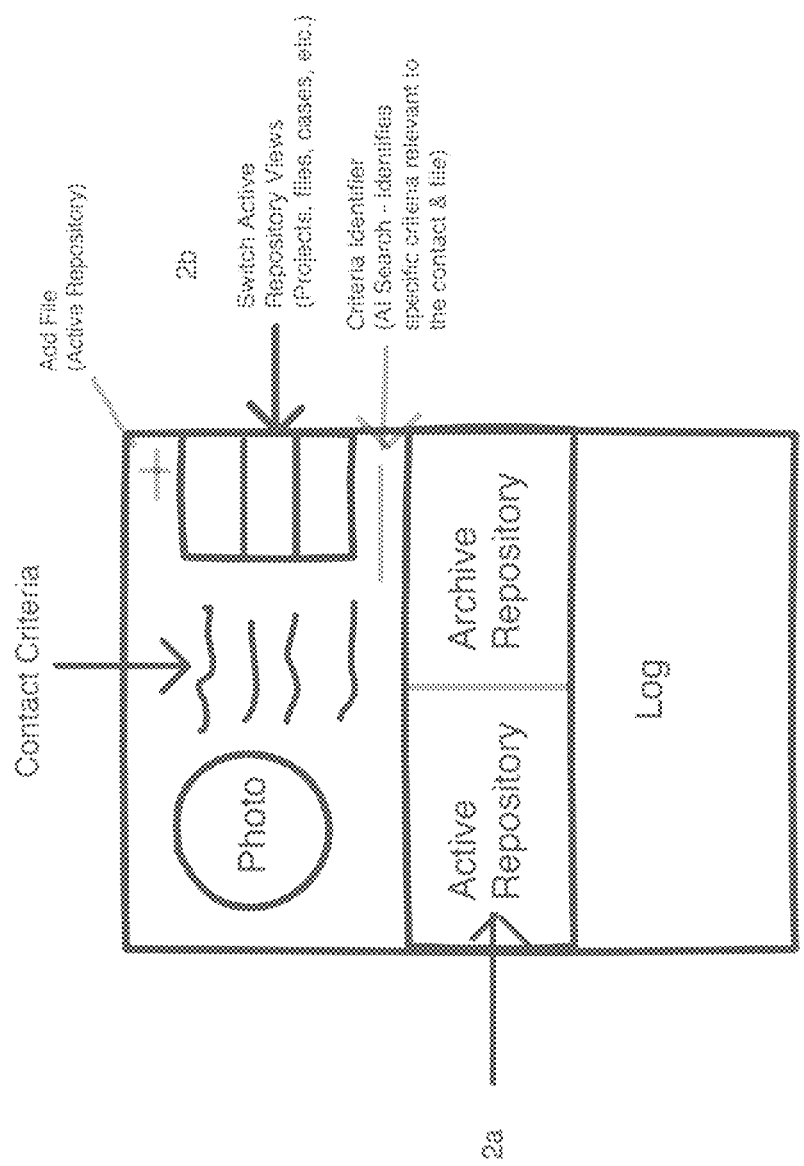
FIG. 1D Contact—Create Folders/Project/Case files access Active & Archive Repository.

In the users contact profile, are displayed; the criteria, Active Repository Archived Repository Folders and sub-folders, (See FIG. 1D).

In the contacts profile, the user has the option to choose between project folders. By tapping on different folders, designated for different conversations, objects and subjects change what is in the Active Repository. The Active Repository is communication based in relation to a contact. In contacts the objects or folders contain a unique set of objects or items to be communicated. The Active Repository is conversational (communicational) based and relates a specific subject in a moment in time that relates to a communication or event (See 2b in FIG. 1D). Objects & Items are grouped in the Active or Archived Repository per communication.

Objects are added in the User's Contact's in the Active Repository. When a Contact communicates with the user, a notification takes place and the user accesses the Active Repository of objects related to the contact and a conversation. The notification always takes place in a communication application or Home Screen of the user. The Active Repository is hidden on the home or communication screen.

The repository has objects waiting and is indigenous to the contact that is creating the communication with the user. The objects change per communication, contact and event. The objects are those items that are selectively associated and relevant to a conversation. Objects are any item that can be copied or attached.

A new contact can be added during a new communication, groups etc. can be modified while communication is occurring.

The Application organizes any object or information and attaches the object to the User's contacts. The User can also attach the object to numerous contacts, or all contacts, or to one contact if so desired, there is no limit to how many contacts can be electively associated with the object. The objects are attached to a contacts profile. Objects can then be organized in folders & subfolders.

Within the Contacts directory, a profile project name or folder can be added, i.e. a non-person and specified label as determined by user, E.g. "Company Name, Project, or Event, etc." In the user's contacts, folders and subfolders, objects are stored active until the user's communication or event is completed. Prompts request an action to archive or keep the object active until the next communication.

The user has the option to access and work or review the objects that are in the contact's repository or calendar event/s date & time. By switching views, in contacts, of folders and objects (See 2b in FIG. 1D and see also FIG. 1E) the user can prompt and que an event. In the user's contact what is in the Active Repository will be mirrored in the Home Screen and the user will have access to those items when a notification takes place.

Contacts Breakdown

Objects—Information/Objects are attached to contact/s, and bunched or aggregated, with a category or title, time, and date stamp.

Contacts Profile: The computer, tablet, and mobile device—implementing a method wherein the method is performed and Consists of Contacts program that stores and coordinates the user's contacts Criteria, Active Repository, Archive Repository, Home Screen Access View, Archive Access View, Folder or Project Repository, Calendar Object Event View. Information/Objects are attached to contact/s, and bunched, or aggregated, within a category or titles that are time and date stamped. The application is a free-standing application and contacts is indigenous to the application. A new profile address book is created. Contacts are manufactured within the new application contact address book. Contacts can be imported from the user's device into the contact application. Or created independently on the device within the application.

The Contact/s profile display of items are; photo of contact, contacts criteria, Active Repository, Archived Repository, Notes, Projects or Folders, Calendar etc. (See FIG. 1D). From the user's contact profile, the user can access the objects waiting to be discussed in the Active Repository or Archive Repository. User creates folder and subfolders to attach objects and categorizes them in subfolder to organize a project or meeting in the folder repository (See FIGS. 1D and 1E). Under the user's contact/s profile is displayed the Active Repository for active Objects.

On the right side are displayed the Archived Repository files, that also allows access to search. Touching the left rectangle enables access to the front screen active repository for those Objects that are to be discussed, in the future, or on a set date and time.

Figure 1E:
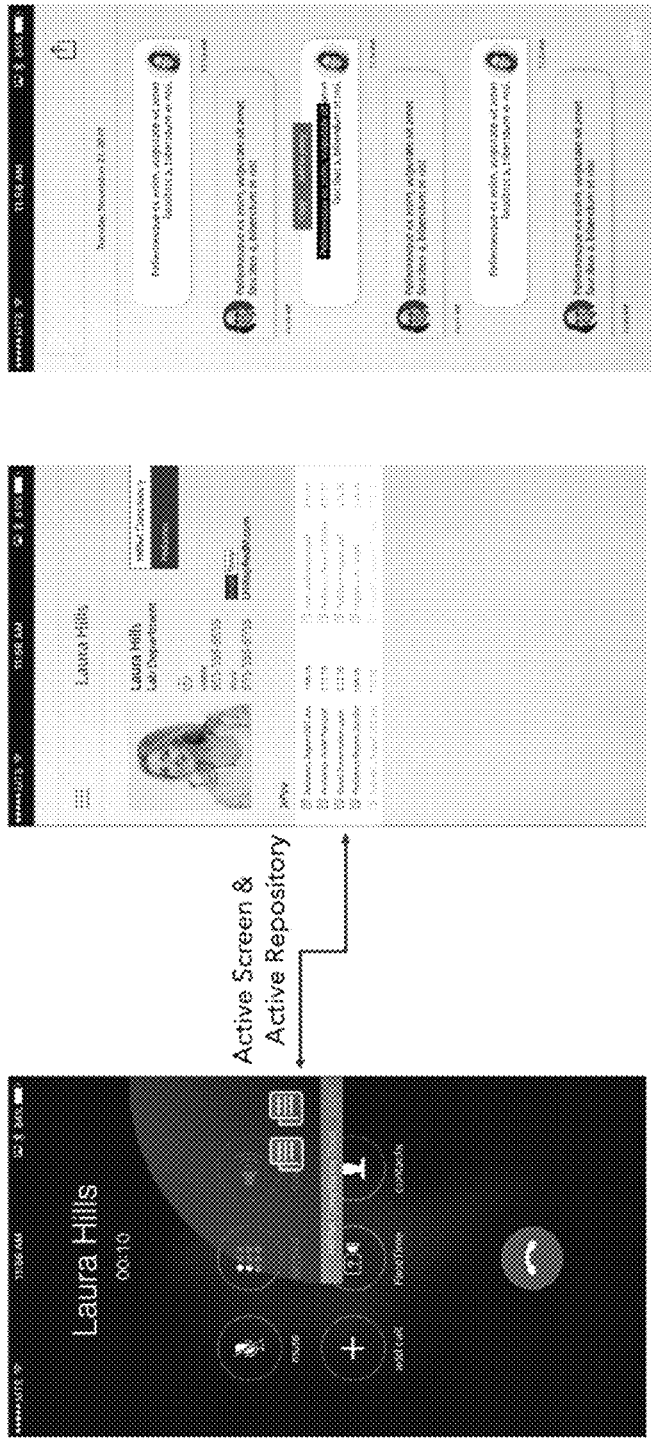
FIG. 1E Active Repository on any Screen and Contacts view.
Figure 1F:
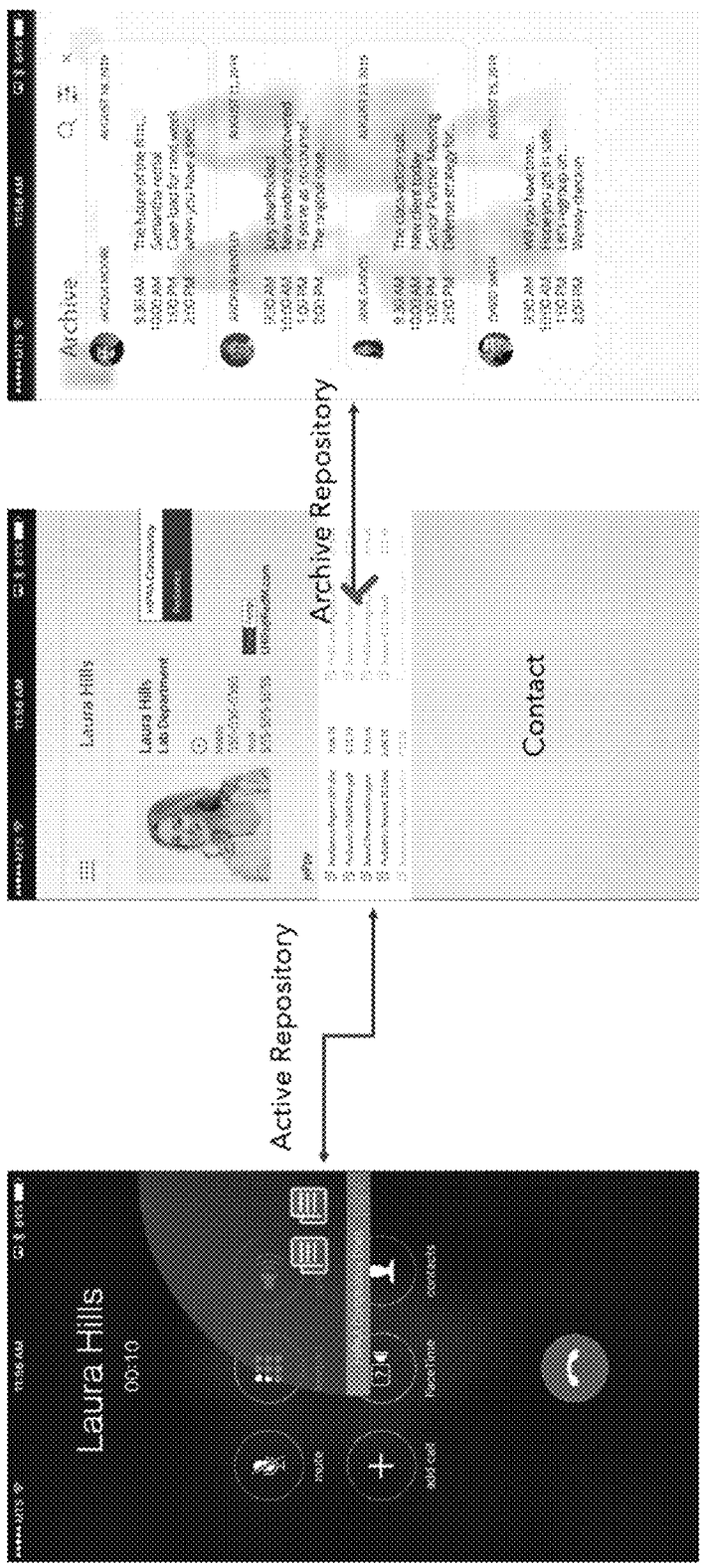
FIG. 1F Active & Archive Repository and Contact Screen with depiction of active and archive objects.
Figure 1G:
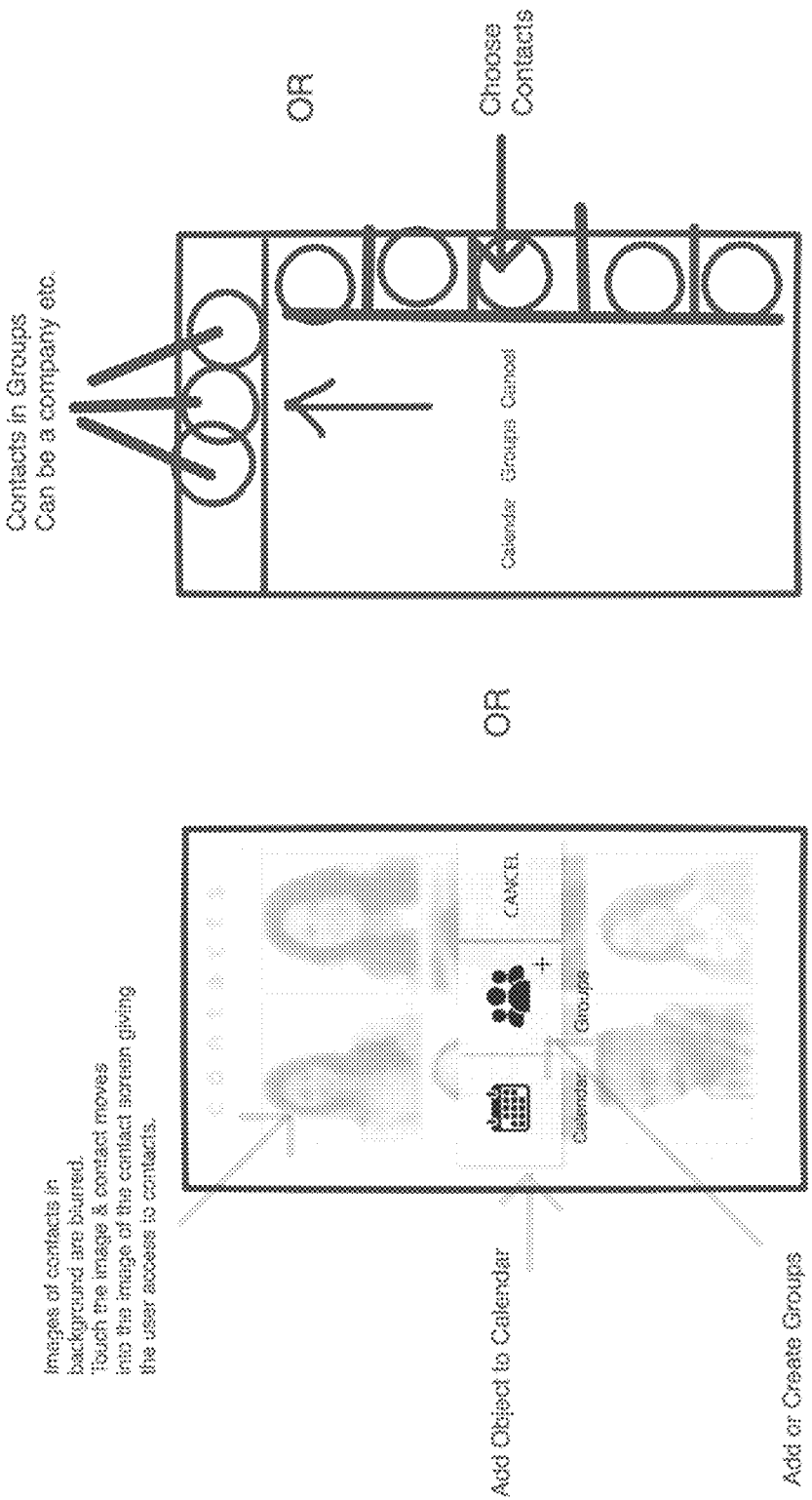
FIG. 1G Adding screen to Calendar, Groups, or Contacts.

On the right are the archived & saved repository of objects (See FIGS. 1F and 1G). Set a time & date for activating object/s. On the time and date of event or meeting, the objects are available and ready for access in the repository on the user's front screen. All objects can be saved to active repository or archived repository.

On the Home Screen of a locked device or unlocked device, the Repository can be password encrypted to prevent any access by unauthorized users, this feature is set in Global Settings.

In Global Settings, the user can assign a Left or Right access side for the Active Repository. User can also touch and hold the Active Repository to move it to any of the home screen sides of the window, to move it out of the way, or to open from that selected location. User can move the access point; up, down, left, or to the right side of screen.

The Active Repository can be accessed from any communication application. (Example: Email, Text, Phone Call, Home screen, Facetime, skype, etc.)

In Contact's Profile, the user can Drag and drop, remove, add, items to both the Active and Archive Repository.

In Local Settings, user can add additional items to the Active Repository and Archive Repository.

In Local Settings, user can add items and save to Archive Repository directly.

In Local Settings & in the Contact Profile, user can create folders and subfolders to organize items.

Send/Share Contact. The Contact Profile is sent to a user or contact that is utilizing this application.

Send/Share Contact with Active Repository—Send or Share the user's contact and Object/s and Items that are in the Active Repository.

Home Screen—Cellular screen—Objects are tagged in users contacts profile.

Object Attachment to Contacts Profile—The computer, tablet, and mobile device, wherein the method is performed and Consists of Keys Points for Contacts: Active Repository, Archive Repository, Home Screen, Folder or Project Repository. Objects are stored in a repository in contacts and instantly retrieved in the contacts profile.

Criteria: Contacts identifies criteria and can create criteria as the user requires; First & Last name, business name, phone numbers, emails, address, URL, add other, notes, birthdate, how the user met the contact and where, and other vital information, including and not limited to social media platforms associated with contact, notes with date and time stamp, etc.

Create a Subject, Company, or any specific item that will be associated with the objects added to a profile. This takes place of a contact file and can be used as a project or milestone.

Repository Overview

Access to the Active Repository, by default, is on the home screen of the device and can be locked and password encrypted in Global Settings (See FIG. 1B).

*Modular denotes that the repository can be re-located after opening. Also, and by default in global settings, the repository can be located according to the user's discretion, left handed users etc. in variable places on the Home Screen.

With the Active Repository open—Swipe between folders or specific projects while in conversation. This gives the user immediate access to projects or named events. While in conversation swipe up or down on the Active Repository Home Screen for instant access to a new subject, items, objects, folder, project, while in discussion, etc.

To access the home screen repository, a swipe of the thumb or finger, in a natural motion, up or down open the repository immediately, giving access to the associated objects. The Active Repository is accessible on the lock screen with or without a password thru Global Settings. When the communication is completed options are available to archive the objects, keep the objects in the active repository or send to contacts, etc., plus other selectable prompts, (set in Global & Local settings).

After notification, by tapping on the folder or project name the objects associated with a specific project or folder is viewable in the Active Repository. These objects are bunched or grouped in the Active Repository until a communication or event is completed. The user is prompted to choose between options to keep the objects active or archive.

Archive

Archive is the location of dormant or unused objects and is accessible for the user at any time. Items are grouped in archive according to a dated event or conversation related to a contact. Archive is accessible and located in the users contact profile. Server based all search queries utilize AI and voice command.

The object can be immediately saved to archives under the users' profile in the Archive Repository, or, the object can stay on the device until a scheduled time after a communication has taken place. The object can also be scheduled/re-scheduled in calendar and set to align with a user's event.

Under Global or local settings, the user can set parameters on how the application performs, and the length of time for objects to stay in the users, Active Repository on their device. Performance of each prompted characteristic that is desired by the user is in the Global settings and local settings of the application.

A user adds items and objects, including and not limited to: reminder, notes, links, photos, documents, text or any communication, voice notes, copy of quote, anything, etc., to that contact/s, associated information that is then mirrored on the home screen of the device, as being in the repository, allowing the user access when a communication takes place and notifications is activated, alerting the user that an item is in the repository.

When attaching objects, a date time stamp is added to the object in the archive and bunches/aggregates "bunch focuses" those items according to the event. In other words, if the object is associated with several people, a universal date, time stamp is applied to each related contact.

The Archived Repository gives the user access to all archived items. In the users contacts, the users archive is easily accessed by tapping on the users Archived Repository (See FIG. 1F). The archived repository allows the users to scroll through objects that are archived, or the user can conduct a search by holding on the archived repository for One second which prompts the search for that contact. The search repository allows the user to see what is in the archive, and search to access the archive content instantly (See Archive Repository, FIG. 1F).

Archived objects are easily accessed by tapping on the contact, the archive repository in the contacts profile is displayed below the name of the contact (See FIGS. 1D and 1F).

User can search from the contact/s archive repository or search within the APP. The Archive displays those objects, offering easy search retrieval of such information for the users of mobile, tablet, or computer devices.

Attaching objects is simplified by tapping on the local settings of any attachable, copy/draft/document, or object, add to Active Repository or, or save file to Archive Repository, create a folder, add to subfolder, add to project, etc., prompting the user to identify which contact to attach the object to. The user can attach to one or all contacts as so desired. Once the object is attached to the user's contact profile, it is instantly in the holding active repository (See FIGS. 1H, 1D, 1F, and 1B).

Server

When objects are Archived, they are sent from the users device to a server platform where they reside, if or until, made active again.

Figure 1H:
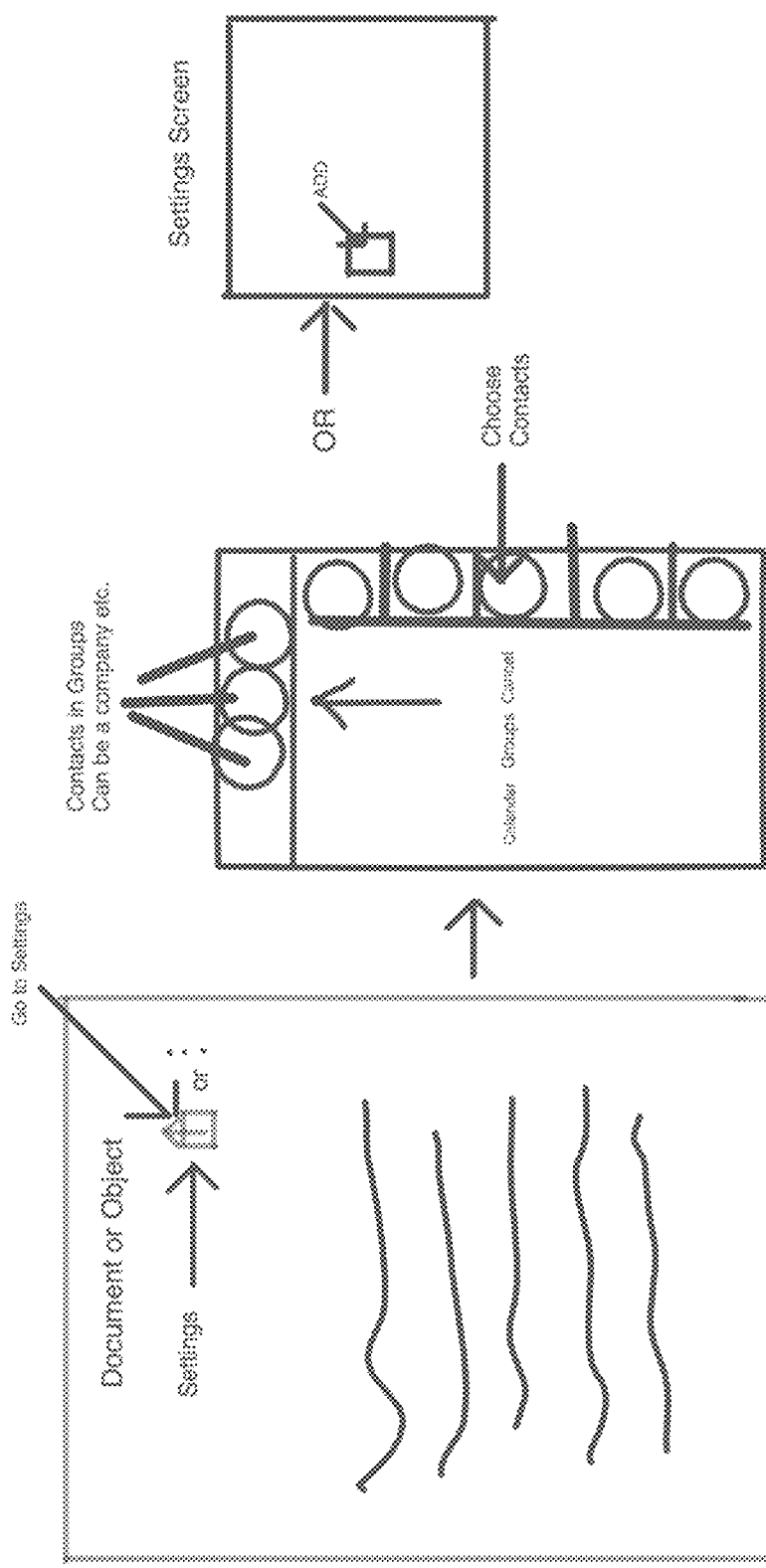
FIG. 1H Adding Document or Objects from the ADD screen and Settings. Access to ADD.

Any attachment from another program can be added to the Active Repository and Archived Repository (see FIG. 1H).

The option of using the program server or the users own server. Users can add objects or information from any of their applications or programs and keep that information on their own servers. An example of this is for Hospitals keeping patient information proprietary and not using a 3rd party server to retrieve information. The information now lives on their servers and information is instantly retrieved through this program.

Repository Breakdown

A location where Objects are stored temporarily on the device in contacts or long term in archive.

Objects are stored in a repository in the application.

Objects are stored in a repository in the user's contacts profile.

Objects are stored in archive off the device.

Objects are aggregated or bunched "Bunched Focus" together per event or conversation (Conversation—a group of discussions points that will be time date stamped and archived together for ease of retrieval.) Objects are focused and organized per event. The event groups objects together with a date and time stamp that is viewable in Active or Archive Repository.

Active Repository: The computer, tablet, and mobile device, wherein the method is performed, and Consists of Active Objects located on the lower left quadrant of the contact profile (see FIGS. 1D, 1E, and 1F).

Accessible from the home screen of the device.

Holds all objects in an active space.

The active repository is on the user's device for a period of time as designated by the user, until the items are saved, moved to archive, or deleted.

Active repository holds objects for conversations and access.

User accesses the objects, dependent on the communication, in the home screen, or the screen from which a communication is taking place.

Objects are tagged and prompted from notifications when a contact is in communication or within proximity.

Tags and Reminders are attached to objects and Users Contacts profile to notify the user of a specific event.

Objects and Items are interchangeable, they can be dragged and dropped from the Active Repository to Archive Repository instantly.

Archived Repository: The computer, tablet, and mobile device, wherein, the method is performed, and Consists of Archived Objects which are located on the lower right quadrant of screen in contacts (See FIGS. 1D and 1E). Information is archived by contact, bunching or aggregate, category, time, and date stamp. Search can be initiated based on any of these criteria.

Objects are located on the hard drive that is created by the creator of the application.

Objects are located on other hard drives and other applications that are used in other applications that the user has purchased. The application uses the transport system created by the application, and uses the purchased applications to archive their objects. (2nd & 3rd generational program)

Objects are in the contact/s repository and give immediate access to all attached objects from archive.

Archive is on server.

All archived items are easily accessed from search or in user's contacts and can be retrieved at any time.

All objects in the Active Repository, can be removed, added, dragged, or sent to archive.

All Objects are subject to archive after designated time (managed in global settings).

All Objects are prompted to archive after communications is completed or retained in the Active Repository for further communications.

Screen Movement—The computer, tablet, and mobile device, wherein the method is performed and Consists of the Active Repository when activated can be moved to any area of the screen for access to any to other features. Move to middle, side to side, up down, left or right. Snap or lock the open screen.

Secondary Repositories

Secondary, customized and screen space varied secondary repositories are included. Customizable versions of the Repository will be accessed in version specific ways. These secondary repositories can operate in conjunction with character mods or scenic descriptive versions which allow the repository to be opened in version specific ways. Customizable Repositories are both accessed and version driven (See FIG. 1J).

Secondary Repositories Operations Breakdown

2nd Repository: User can swipe up and open a secondary (2nd) active repository on the home screen. This secondary active Repository it offers additional features to the user, for example; facilitating purchases, creating lists, saving personal information, as well as receiving, attaching and sending objects. Additional active repositories can be added with different features as needed.

The user is operating a device which may comprise of a computer, tablet, and mobile device. Access from the home screen of a communication program or the device requires movement swiping from the side of the users device. This feature can be programmed in settings to accommodate left or right-handed user's, down to up, in an upward motion to access the Active Repository 2 (See FIG. 1J).

The object/s in the repository allow the user access to items that are tangible, for instant notification, long term, consumer purchase, reoccurring purchase, reoccurring object/s, Notes, savable, or memorable items, send, readable, or/and any object that is considered, "worth saving," and communicating that objects to other contact/s.

The items in the 2nd Repository are not associated with any one contact. The 2nd Repository retains objects and information for sharing or reviewing for tagging or purchasing for.

The items are tangible and readily accessible at any time.

The items are instant messaging, example; favorite quote, grocery list, reminder, calendar update, note, etc.

The 2nd Repository can be password encrypted to prevent access of unauthorized users and set in Global Settings.

Create other Repositories with color or photo identifiers.

The user is operating a computer, tablet, or mobile device. In Global Settings set the assigned side for the 2nd Repository to Left or Right side. User can also touch and hold the 2nd Repository to move it to any of the home screen sides of the window to move it out of the way or to open from that location.

Favorites 2nd Repository

The items are the user's "Favorites" and reoccurring items are readily available and attached to the 2nd Repository for purchase of an item. The user can tap to reorder any item.

Highlight any quote and attach to the 2nd Repository to share or read.

Gives access to Reminders, Calendar, etc.

The 2nd Repository allows for instant purchases bypassing a search for the item to be reordered. The 2nd Repository allows for instant access.

Search

Search shows the contact, the information associated with the word search, associated with contact/s, through a translucent screen that gives access to the user's contact's event/s.

Search—a computer, tablet, and mobile device implemented method, the method is performed and Consists of;

All Objects being retrieved by search within the application and/or user's contact/s.

Two or three fingers, Pull screen down on any window in application to access Search.

Request verbally from AI (artificial intelligence), a specific item to search.

Inquiry Search aggregates a list of contacts with search title requested.

Tap on title retrieved to expand and read.

Tap & hold on the title retrieved searched item/s, to prompt option to retrieve and reactivate in Active Repository in the same Contact/s profile, or to add to others.

Search items are found as bunched or aggregated items per an event.

Retrieved information allows the user to search for specific Object/s, and recommends adjoining object/s, that may be of importance in relation to the item searched. All items associated and grouped with the object will be recommended in the search query.

The AI will search for the item requested and will recommend the adjoining, bunched, focused, grouped, aggregated, cumulated, organized in one place, encompassed, etc., items that are associated with a discussion and word search.

Three-Dimensional Depth Technology and Search Overview

The computer, tablet, and mobile device etc. an implemented method, wherein the method is performed and Consists of the users contacts searched criteria in archive, which appears with layered transparency depth fields.

This transparency reveals subsequent layers, allows the user to touch and hold the screen to access, through the paneled screen or image, what lies behind the archive or top screen or current screen layer. The user moves forward into secondary screen layers, or sub-layered screens, which rise towards user, or up, for contact/s or saved information, to become the prominent screen, still allowing subsequent screens to be seen (See FIGS. 1G and 1I).

The depth technology allows the user to access levels of layered information, while the user continues observing the top screen.

The top (original) screen, remains in a corner on the screen being prompted. The top (original) screen is in constant view and allows the user access to return to the original screen at any time (See FIG. 1G).

The user can access all contact/s that are associated with the search by touch and holding the screen (gesture to be determined). The movement is in depth, layer to layer into, forward, through, or depth moving into bridges through or to the user's contact/s profile.

The movement allows the user to move into the program contact profile, and Active Repository from the Archived Repository. Movement is into the device with 3D depth technology and "bunched focus" (aggregated Objects or items created for a specific event) what we consider is a streamline of information that allows the user access to information requested. User can navigate from the top screen, through, down and back to any subsequent or prior depth or layered screen in the search sequence (See FIGS. 1F and 1G).

Gives access to layers of information.

Gives access to layers of information that aggregates, streamlines, and "bunch focuses" events as associated with word search.

Gives access and moves the user into layers or (3D) in the active contact profile.

The user sees a layer of information or contact below the top or active layer. The user accesses the information by gesture, assigned to accessing the 3D layer.

Tap and press to initiate 3D depth access.

Saving Objects Breakdown

Save—The computer, tablet, and mobile device—an implemented method, wherein, the method is performed and Consists of attaching an object/s by tapping on user's settings. A prompt to save to archive or attach to contact/s is prompted. The user saves the object/s to the contact/s archive and object/s are immediately attached to the Archive Repository. The object is available to add to Active Repository at any time or can be left in the contact/s archive for later retrieval See FIGS. 1G, 1H, 1I, 1K).

Save object/s directly to archive as backup.

Process is the same as Object/s attachment in Contacts Profile wherein, the steps of adding objects is the same, and the prompt gives the user an option of saving to the archive.

Attaching Objects

A quick add button allows the user, from any screen, to add a document, any works, or objects. Simply touch the button that is added to the screen and it immediately adds the object to a specific contact, group, or project folder that is being worked on (See FIGS. 1H and 1K).

Criteria button is engaged in local settings. Criteria is specific information in addition to the users contact. The button is visible on any screen of the users device (see FIG. 1K). The purpose is adding many items to a specific group or person in the Active Repository. The user engages the local setting and the criteria button that instantly becomes visible on any screen the user moves to (see FIG. 1K). When the user is ready to add an Object or information the user taps the button and the information is instantly added. The user identifies or can create folders or schedule the information for a specific conversation in calendar or the users contacts (see attaching objects). The information is readily available to retrieve information for the designated intention.

In Global or Local Settings, the user can choose "quick add" (or similar) to any contact, group, or project folder and an icon appears on the screen, the user is in constant view of the icon as the user navigates through any application. The icon remains constant on the users screen and allows the user to quickly add an object to a specific contact, group, or project folder instantly by tapping on the icon. Simply touch the icon and the object is instantly added. The icon provides access for a repetitive action that the user is taking, so it is consistent with an outcome (example: Sending everything the user is working on to a user's group in Archive Repository whichever the action of choice is).

Quickly add Object/s to multi-Contacts with one tap. The icon is in constant mode and is viewable on any screen. Activate this function is set in Local or Global Settings.

Attaching Objects Breakdown

Object attachment process—The computer, tablet, and mobile device—an implemented method, wherein the method is performed and Consists of An Object in any application on the device, link, photo, file, document, project, folder, note, highlight and copy, reminder, calendar event, etc., that allows for stored data or item that can be attached or archived.

Object is copied to the Active Repository in the user's contact/s on the device in the application.

Cue local settings in any program that can be an object or attachment or copy. Prompt for saving to the Active Repository, Archive Repository (as backup), Send, etc., is requested (see section "Prompts" drop down list) (See FIG. 1I).

User's contact/s, indigenous to our application, is shown on screen (see FIG. 1D).

User chooses as many contact/s as desired to attach Object.

Object is placed in repository in user's contact/s.

Object is immediately tagged and a reminder notification alerts the user when contact contacts the user, is scheduled for an assigned event within calendar, is within proximity, communicates via any communication application, and not limited to; Text, Phone, Email, In-Person, or any known manor of communications, or calendar date is set for an event.

All Objects are readily available to user.

Any Object or Item that is transportable to a user or contact.

Send Object or Item.

Prompts Breakdown

Prompts—attachment process & other: The computer, tablet, and mobile device—implemented method, wherein, the method is performed and Consists of the attachment of object/s and the process thereof. Wherein, the user taps local settings, attaching parameters and features to the application, including, but not limited to the following prompt options (See FIG. 1I);

Add to "Active Repository" (or Similar)
Add to "Archive Repository" (or Similar)
"Send to Contact/s" (immediate request) (or Similar)
Add to "Groups" (or Similar)
Add to "Calendar (Event)" (or Similar)
Create "Event" (or Similar)
Create "Folder" (or Similar)
Set "Meeting/Event" (or Similar)
Create "Groups" (or Similar)
Activate "Active Screen" (or Similar) (Icon that stays on all the screens, while active, and allows the user a quick add.)

Notifications Overview

The objects remain hidden on the home screen or in the device being used, the application, when triggered, opens to a 90-degree angle or any area of the screen desired, revealing the relevant object/s associated with that contact in the Active Repository.

Another descriptive is; Any mutual communication prompts the applications repository to notify the user of the items waiting to be discussed from the communication window or home screen (Example: the user receives a phone call from one of their contacts. The user then receives a notification from the application that something is actively waiting for that contact in the active repository). Notification can be a combination of, but not limited to; vibration, strobe light, sound, illumination of the screen, glows, pop up notification window, etc. anything the user selects the notification reminder to be.

These notifications notify the user of relevant active objects awaiting access. The user swipes from the side of the device downward in a natural motion on the home screen (See FIGS. 1A and 1J).

The user swipes up from the side of the device on the screen in a natural motion on the home screen to revel the second repository. The user/s swipes in a downward/or/upward motion with their finger or thumb, to open the repository on the home screen. After the programs repository is opened, and the conversation is complete or during the conversation the user has options. By default, after a communication has taken place the prompt for options is available to the user.

Notifications Breakdown

Notification: The computer, tablet, and mobile device—implemented method, wherein, the method is performed and Consists of Notification Alerts which occur when a contact begins a communication, or, there are objects in the active repository waiting in the communication or home screen repository. The user can set the notifications in Global Settings. Notifications is an Alert to the user that items are waiting to be accessed, items that are relevant to the contact/s, creating an Alert when a communication takes place (See FIG. 1A).

The notifications are and not limited to: Sound, Vibrate, Light, Banner and Badges.

The user swipes with their thumb or finger, to open the repository on the application home or communication screen. Among other options, the user can send or read the information to the contact. Once the communication is completed, the application offers options to archive the information or keep active in the contact folder for a subsequent communication. Options: Read, Send, Retain for another discussion (or similar), Choose items to archive (or similar), Add to other contact/s (or similar), Add to existing discussion (or similar), and Add to "Groups" (or similar).

Calendar Breakdown

Calendar: The computer, tablet, and mobile device—implemented method & Attachment, Notifications, & Prompts etc. wherein, the method is performed and Consists of adding items linked to a scheduled Calendar event. User creates a future notification event in Calendar. As the event is activated via the set date and time trigger, the active repository notification is activated. (see FIGS. 1G and 1H).

Event is scheduled to notify user at a specific date and time.

Events & Objects are tagged and associated to calendar.

Date and time event are established and activated at pre-scheduled time.

At the scheduled event, the Active Repository notifies user of object/s, a notification given by the applications notification. A notification alerts the user of items waiting in the Active Repository for the event or communication.

The transitory movement of the object is attached from local settings in any application. The objects are added to the contact/s Active Repository and added in the drop-down list from prompts. The prompt requests an action that the object will be associated with, and the double action of choosing "Add to Calendar" adds the objects to the contact/s associated with a communication and adds the reminder to the Calendar.

Calendar creates a tag and notification on the users device at the time of the event. The Object is initiated forward and active based on the event not the individual.

The object/s are attached to the user's contact/s and the event. The user has access to the object/s if any of the contact/s contact the user. The process for completion then takes place.

In Local Settings Object/s and items can be tagged to schedule an event. The scheduled event is activated during a specific Time Date and the Active Repository becomes available during that time.

In the Archived Repository, Local Settings, user tags objects or discussions "Bunched Focus" to be scheduled for an event or communication.

Groups Breakdown

Groups—The computer, tablet, and mobile device—implemented method & "Object attachment to Contacts Profile" wherein, the method is performed and Consists of Object/s that are attached to a Group Profile and create groups with one touch. Object/s are attached to a group. From local settings add to Contact/s or Groups (See FIGS. 1G and 1H).

A list of groups is accessible in the local settings Object attachment to Contacts Profile title or photo.

Create groups in local settings.

The groups are part of the discussion for the contact/s that is/are associated with the object/s.

"Groups" attach objects to a/several contact/s that are associated to the object/s with one tap.

Send Groups, during a conference call or communication, the items that are in the Active or Archive Repository. In Global settings set to automatically send or send manually to the contact/s.

In local settings attaching Objects and choosing more than one contact will prompt the user options to create "Groups" or continue to attach objects to contact/s individually. Once the process of choosing the contacts to be associated with the Object/s is completed, the "Group" will be active until archived.

Create Group's identifier—label, title, color, photo, etc.

Figure 1I:
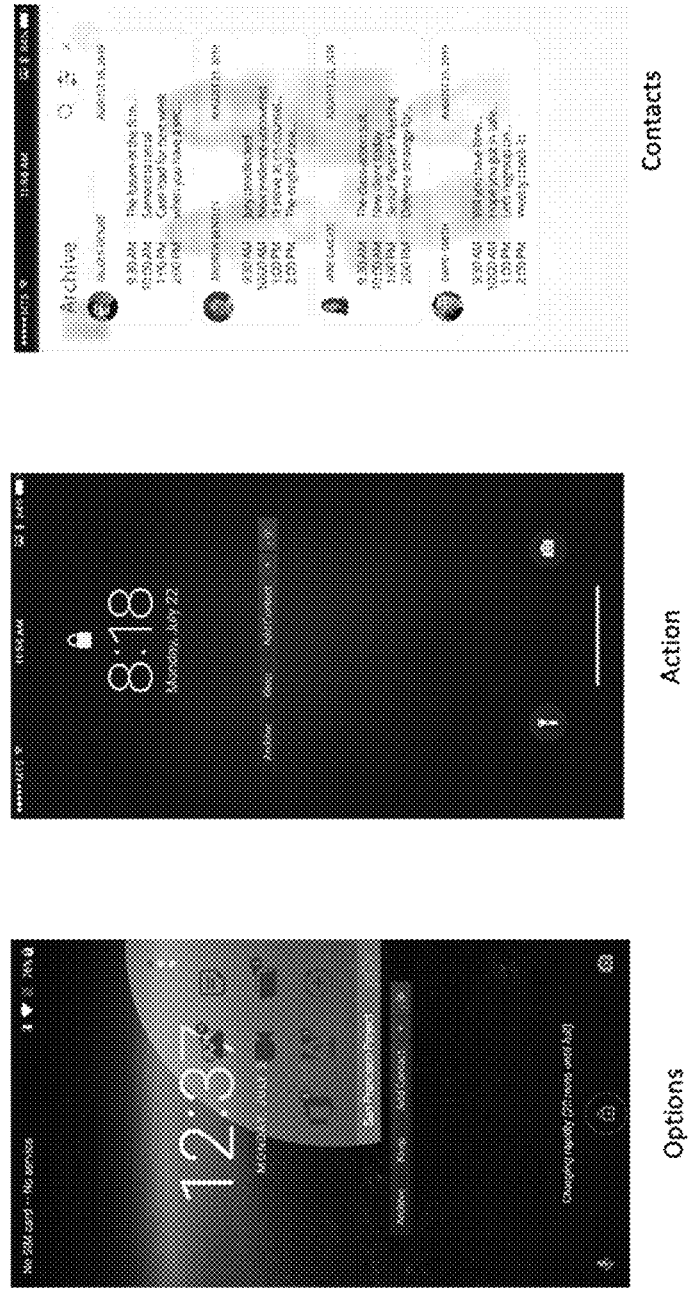
FIG. 1I After a conversation has taken place. Actionable prompts allow the user to keep or archive objects, add contacts, add objects to other relevant users.
Figure 1J:
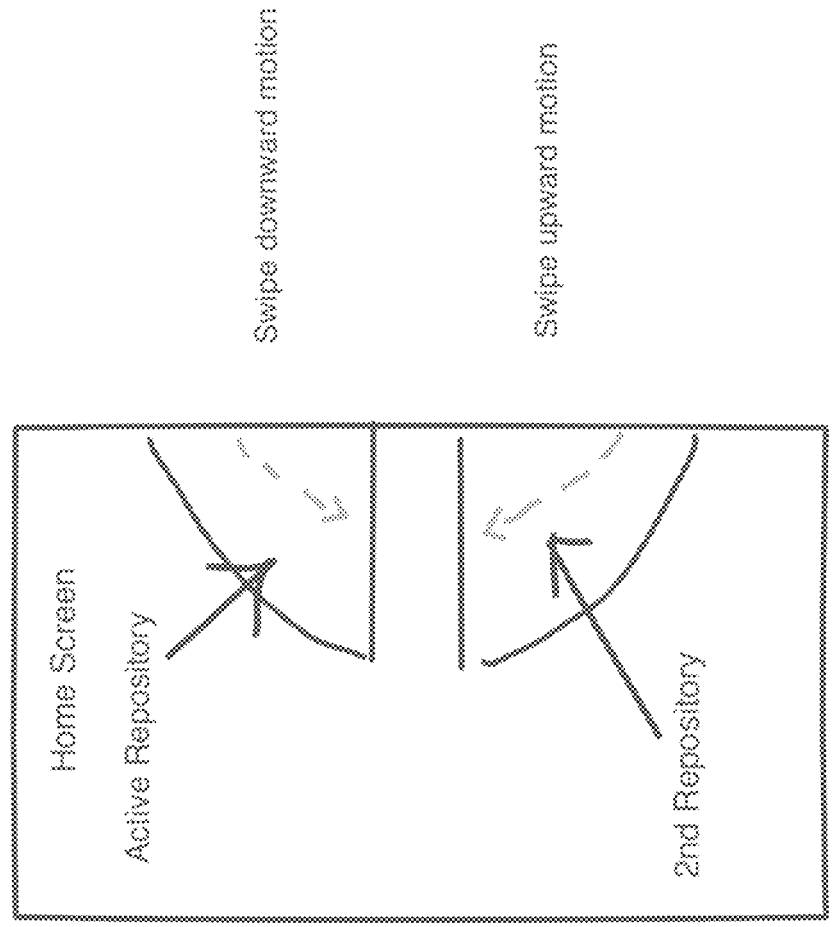
FIG. 1J Depicts swiping motion to open active repository up or down. 1st Repository for Active Conversation or Scheduled Events; 2nd Repository for personal items.
Figure 1K:
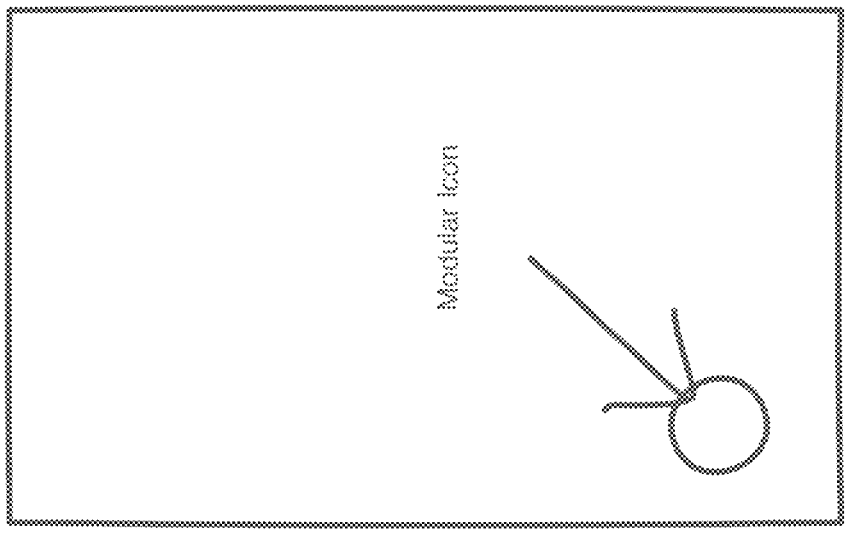
FIG. 1K Criteria & Constant button allows the user to add information to 1 contact, many contacts, or groups when adding a series of objects. Button appears and follows the user as they navigate through their device.

Add contact/s to "Groups" (See FIG. 1I).

From settings add a contact to "Groups" during a communication or add a contact after the communication is completed.

In Global Settings one Icon can be set for many contacts associated with a Group or Event. The icon is constantly in view on all device screens and the user can go to any application to add object/s to the Active or Archive Repository by tapping on the icon.

The icon can be a photo, color, wallpaper, or any image or title the user chooses.

The icon is in view at all times on the screen the user is active in. The icon gives the user immediate access to add object/s items to the repository in all applications being used.

The icon allows the user to add object/s & items for a group or contact.

The icon is a short cut to adding object/s or items or data to the Active or Archive Repository.

The user has a choice to add to icon Active or Archive Repository. (Set in Global or Local Settings)

The user can prompt the icon when working on one contact or a group, at a time.

The Icon—In Global and Local Settings choose "Active Screen" (or similar) to create an Icon of the contact or contacts that the user will add Object/s and Items to. The user will add Object/s and Items continuously to a specific group or contact in this mode. The icon is active and in view in a corner or any place on the screen the user designates. The icon indicates that the user can add object/s and items from any application that allows the Object to be sent or attached.

The icon is on the screen and is modular.

The icon is representational of what is occurring, or a notification that an action of attaching the Object/s and items are taking place.

Artificial Intelligence Breakdown

AI—Artificial Intelligence: The computer, tablet, and mobile device—implemented method, 2nd Repository, and all other program features. The AI monitors the user's patterns and creates pathways for the user to choose from giving the user access to items being created with immediate access. The AI includes and is not limited to;

Favorite places,

Groups and organizes most often used items and contacts.

Simplifies and streamlines items being discussed.

Monitors communications and notifies the user of discussion criteria, etc.

Simplifies access and prioritizes.

Notifies user of any anomalies.

Geo-Fencing, Rfid, Nfc, Line-of-Site, Mapping, Location Services Breakdown

Geo-Fencing, RFID, NFC, Line-of-Site, Mapping, Location Services—The computer, tablet, and mobile device—implemented method, 2nd Repository, and all other features wherein the method is performed and Consists where a user moves into a specific location or event wherein the contact is in the same geographic location and the information is tagged to the event and/or contact profile. Notification Alerts or prompts the user to access information waiting to be discussed in the Active Repository.

User is notified of contact within proximity or same location.

User is at a location and notified when user has arrived at the destination.

User can set request in local settings in the user's contact/s profile.

Object/s is/are tagged to an event and Geo Fencing is activated in local settings.

Active Repository notifies user of items to discuss when user reaches a location or moves into a location. Immediately the user is notified of Active Object/s to be discussed.

Location uses maps or Geo-Fencing to identify the event.

Active Repository notification becomes active when contact is in line-of-site, or at the location.

Send Breakdown

Send: The computer, tablet, and mobile device—implemented method, wherein, the method is performed and Consists of sending the contact or any person the information that is in the Active or Archived Repository.

"Send" allows the user to send to contact/s at any given time what is included but not limited to;

Send via email, text, other program, or any type of communication transport system.

Send from Active Repository during or after a communication. (NOTE: Other contacts have this application on their device.)

Send from Archive at any time.

Send during communication.

In Global Settings set "Send" to automatic user does not have to take action during a communication, and all items discussed will/can be sent to the contact/s.

Global Settings Breakdown

Global Settings—The computer, tablet, and mobile, wherein the method is performed and Consists of several options and default factory settings.

Global Settings is in Device Settings.

Reflects all Global aspects of the users experience of the application.

Set parameters to all aspects of objects, how they move, are set, calendar, length of time, prompts, when to, etc.

Local Settings

Local Settings—The computer, tablet, and mobile device—implemented method, wherein the method is performed and Consists of Objects and Items to be changed or addressed while using the application.

Access parameters in the application.

Any and all movement and aspects of the Object/s or Items to be addressed.

Flow

Folders and Files (See FIGS. 1D and 1E)

When setting up a new file, the file management side of the application initiates a setup protocol which can be modified in Global Settings. The system has file management tools and protocols which interact with the other aspects of object management. This functionality is available on mobile, tablet and computer systems in the applications settings.

When a new file is selected, the program prompts the following responses from the user, or they can be locked in global settings. They include but are not limited to:

Type of file application. E.g. client/s, professional contact, personal contact, project file, etc. By selecting the file type, other parameters and functions, accorded to type of contact are initiated.

Active Repository Folder or Object Timeline: User can determine the active timeline of any given folder, or render it indefinitely inactive, as the folder reaches the end of its designated lifetime, the folder cover transitions through identifiers. (Example, number system of days left or colors from green, to blue, to yellow to red.) In Global and Local Settings the User has the option to add or subtract days or weeks in the identifier, i.e. additional or less time to reset the protocol transition; example—colors for the folder cover.

Active Repository Timeline: User can determine the active timeline of any given file, or render it indefinitely active. As above, the files contained within a folder can be assigned a designated active timeline, transitioning through the same color protocol as the folder cover. As above, time can be subtracted or added in keeping with project/personal deadlines etc.

As a file or folder reaches its time of maturation or end life, or critical deadline or use, the system sends notifications to the user of files or folders that are nearing a pre-designated milestone. These notifications are a proactive reminder and can be adjusted and set in Global Settings. For example, notifications are sent to the user 2 weeks, 10 days, 1 week, etc., then every day before the deadline is reached.

As files or folders reach their designated timeline, they rise to the top of the folder list. This can be overridden in global settings, in the default setting mode of the application, objects rise objects to higher positions in the folder list as they reach their pre-designated timeline end. These daily work priorities can be adjusted in Global Settings to suit the project, client/s, or object in question.

Urgent notifications set to the folder or file, trigger an alert for notification to the user from the application.

SCREEN Depth (Forward Motion moving into the screen)

In keeping with the same depth technology as explained in 3D Depth Technology, section 060, contacts, files, folders, objects etc. appear in depth layers on the screen real estate. Contacts, files, folders, objects etc. can be organized into vertical or horizontal banks as designated by the user. They can be organized and characterized by most used, international, state, or priority based, etc. any parameter included in the profile information through which, a search can create an association. A data identification unification system.

The user can organize the information into banks that are layered in order of priority or relevance to the desired task or search. For example, vertical bank one contains the members of the board, bank two on banks one's right contains senior management, bank three contains the midlevel managers, bank four contains the regular employees and bank five contains sub-contractors, etc.

The user can, through the dashboard, select a single, multiple, or all banks to communicate a message, video, text, e-mail, live video etc. By using the same depth filed technology, the user can navigate through the lesser levels to identify singular, contacts, objects, files, folders, etc. and bring them into the active repository.

In Global Settings Search query can also organize the folders based on an association to a group or the query of information requested. The search is in direct proportion to the subject and any person or object associated with such query. The search identifies other possible objects associated with the query.

Mods—The computer, tablet, and mobile, wherein the method is performed and Consists of skins and animations for the repository arm and scenery. Added to the application they can be seasonal displays, events, avatars, etc. (example: 4th of July—when the arm of the Active Repository opens the end of the arm has a skin of fireworks and the animation moves around the screen and explodes into animation of fireworks display, or snow falling or various scenes in the repository background display, or can be a company display of logo, etc.). Different scenes are created and can be personalized for a user or company.

Priority Button—The computer, tablet, and mobile device, wherein the method is performed and Consists of a round button with a contacts identifier (i.e. photo, avatar, etc.). The button gives access to an individual or groups. It allows the user to add objects and items quickly. The button can also be customized giving it band width and scalability. The button prioritizes with a specific contact tasks related to the contact. The button remains or is semi-permanent on the screen. Work on any object or item and immediately attach that item the user is working on by tapping the contacts picture or avatar. The object or item is attached to the contact and added to the Active Repository or in the Local Settings. The user can set to a contact to receive the object or item they are working on in the application. Touching the button immediately saved the object or item the user is working on in the format and device application the user is in (example: Apple or Microsoft programs or PDF.). When the contact & user both have our application the user sends objects/items application to application end to end and is instantly sent without having to complete email or text information. The user works on the object or item, taps the picture or avatar on the screen, the items are instantly sent or added to the Active Repository. Options also allow for instant archiving under that contacts profile in the Archive Repository.

Features and not limited to; A. Prioritizes information instantly sent to contact. B. Prioritizes and adds to Active or Archive Repository. C. Based on a Scheduled event—work on a timed task the picture of the contact (or their avatar) changes and switches to the next scheduled contact picture or avatar for instant access. The next scheduled contact's picture or avatar is depicted as a circle on any screen you switch to, allowing instant access. (Example: Work on Betty's projects at 11 am EST at 12 pm EST work on Tom's scheduled events. The contact switches from Betty to Tom instantly. This is a quick add or send button and saves time for the user to add or to send to the contact directly or to add to the Active or Archive Repository.

Importance indicator on the objects or items in the Active Repository. Set priorities of objects and items to be completed.

Active Repository Button—The computer, tablet, and mobile device—implemented method, wherein the method is performed and Consists of a button that is available and activated on any screen by tapping it. Items are instantly available. Objects and Items are those items that are important to the user and can be retrieved at any time. They can also be retrieved in the 2nd Active Repository. Swipe up during a communication.

Pyramid Information Archive

Primary contact is the highest point on the pyramid, to the right move back into the depth field is the second through last banks of information. To the left of the pyramid, is more details on the contact or object. The user can navigate down to the third level, bring the third level to the top screen, then navigate right or left to identify and select objects, etc. that are contained within the bank, object, or contacts profile.

For example, the user can navigate down to the fourth level, select a particular employee, open a file and select a particular file within a particular folder. The user may select that singular or multiple contacts, in order to initiate a video conference, text message group etc.

Information Access

Retrieving information does not require a wifi connection. Information is found in three (3) Locations; Server (Hard Drive), Cloud, & users Devices.

The program instantly downloads information to the users device within a set time allocated in Global Settings before a conversation or event date takes place.

The user does not require wifi or internet connection. (NOTE: the user can keep information only on their device, however, this will increase the amount of space/memory the user utilizes on their device.)

Information is downloaded within the allocated time the user presets in Global settings.

The user has error message if information is not properly downloaded.

The user has access to all information and can manually download the information.

After the users information, for the active repository, is downloaded the users have access during the scheduled event or when the users contact communicates in any way from any communication program the information is readily available.

Backup

Information is backed up on the hard drive in the program or the users servers.

All Active repository information is backed up and stored on the hard drive.

All Archived information is backed up and stored on the hard drive.

All information can be restored on the hard drive.

2. 1 Centralized application that organizes information & attaches that information to the users relevant contacts or a scheduled event.

3. All information that resides in contacts instantly shows up when a contact communicates in any way with the user. All information that is scheduled for an event/meetings is instantly available at the time of the event/meeting. All information is brought to the user—No search required.

Organizes information in Archive for the user. Application organizes information before, during, and after a conversation.

Creating an association between the users contacts their conversations and their relevant documents or objects. Conversational based Technology.

Criteria & Constant button—the constant or criteria button is useful when many items/objects are added to a specific contact. Adds documents/information or objects to one or many contacts. The user is adding one (1) or many items and/or the user is adding to one (1) contact or groups that are assigned to the criteria button at the time (see FIG. 1K) the active repository from any screen to attach it to a relevant communication that will take place in the future.

The descriptions herein are presented to enable persons skilled in the art to create and use the eye vergence controlled systems and methods described herein. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well known machine components, processes and data structures are shown in block diagram form in order not to obscure the disclosure with unnecessary detail. Identical reference numerals may be used to represent different views of the same item in different drawings. Flowcharts in drawings referenced below are used to represent processes. A hardware processor system may be configured to perform some of these processes. Modules within flow diagrams representing computer implemented processes represent the configuration of a processor system according to computer program code to perform the acts described with reference to these modules. Thus, the inventive subject matter is not intended to be limited to the embodiments shown, but is to be accorded the widest scope consistent with the principles and features disclosed herein.

The foregoing description and drawings of embodiments in accordance with the present invention are merely illustrative of the principles of the invention. Therefore, it will be understood that various modifications can be made to the embodiments by those skilled in the art without departing from the spirit and scope of the invention. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A method of managing a set of documents in a contact-centric system, the method comprising:
   receiving the set of documents via communication with a party having a contact profile;
   organizing the set of documents in association with the contact profile;
   prompting a user to access one or more of the set of documents upon further communication between the user and the party, the prompt being automatic and based on the association between the set of documents and the contact profile; and
   maintaining the set of documents as one of multiple sets of documents, each of the multiple sets of documents being associate with a different contact profile or group of contact profiles.

2. The method of claim 1, further comprising providing an option for the user to archive one or more members of the set of documents, wherein the automatic prompt for the user to access one or more of the set of documents is made for non-archived documents and not for archived documents of the set.

3. The method of claim 1, further comprising associating members of the set of documents with a future event, such that participants in the future event receive automatic access to the set of documents, the participants being represented by contact profiles and the set of documents being associated with both the contract profiles and the event.

4. The method of claim 3, wherein the future event is a meeting.

5. The method of claim 1, wherein prompting the user to access the one or more of the set of documents upon further communication is independent of a means of the further communication.

6. The method of claim 1, wherein the communication with a party having a contact profile occurs in a first e-mail thread and the further communication occurs in a second email thread independent of the first e-mail thread.

7. The method of claim 1, wherein the communication with a party having a contact profile occurs in an e-mail thread and the further communication occurs in a conference call or video call.

8. The method of claim 1, wherein the set of documents includes a pdf document.

9. The method of claim 1, wherein the set of documents are associated with multiple scheduled events, the scheduled events including the user and the party.

10. The method of claim 1, wherein the set of documents are associated with multiple future events, the future events including the user and the party.

11. The method of claim 1, further comprising retrieving the documents.

12. The method of claim 11, further comprising searching the retrieved documents.

13. The method of claim 11, wherein the documents are retrieved in response to an event, the event including the user and the party.

* * * * *